United States Patent Office 3,009,631
Patented Nov. 21, 1961

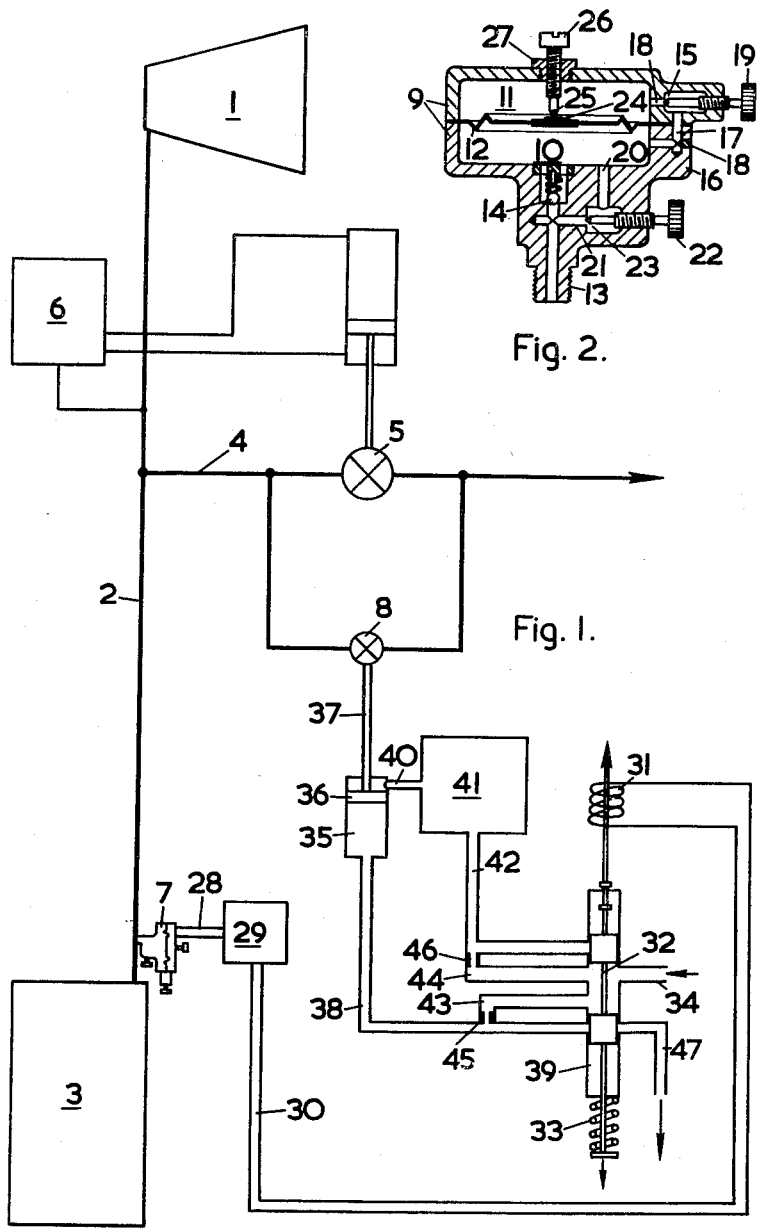
Nov. 21, 1961.   N. A. DIMMOCK   3,009,631
CONTROL DEVICES FOR FLUID PRESSURE SYSTEMS
Filed April 30, 1957

3,009,631
CONTROL DEVICES FOR FLUID PRESSURE SYSTEMS
Norman Albert Dimmock, Woking, England, assignor to Power Jets (Research and Development) Limited, London, England, a British company
Filed Apr. 30, 1957, Ser. No. 655,983
5 Claims. (Cl. 230—115)

In the operation of power plant or other apparatus employing gases under pressure it is often necessary to have fluid-pressure-responsive means for protecting the plant against disturbances and particularly against temporary or transient disturbances.

Thus for example a dynamic compressor should be protected against the consequences of flow disturbances. The angles of the blades in such a compressor are chosen to suit a certain relationship between velocity of flow and rotational velocity and the compressor will not operate with more than a certain deviation from that relationship; thus it is found that, at a given speed and pressure ratio, reduction of flow below a certain value causes surging. A protective device in the form of a blow-off valve in the outlet duct from the compressor can open, to increase the total flow through the compressor, under the control of pressure and flow measuring means, but this is usually slow in action and moreover opening of the valve is not initiated until the disturbance reaches measuring point which is usually near the compressor. Accordingly it is desirable to have also some means for quickly producing at least a temporary blow-off in automatic response to a change in a condition of flow near to the source of disturbances which would later lead to surging conditions at the compressor rather than response to conditions near the compressor.

The present invention is concerned with means for solving the aforesaid problem, but it is furthermore concerned with a pressure-responsive device having other possible applications.

The invention comprises a fluid system including a dynamic compressor having a control device consisting of actuating means movable in response to a change of a condition of flow at a point in the system, which change might lead to surging of the compressor, to actuate quick-acting auxiliary protective means for delaying surging of the compressor, the control device further consisting of timing means for terminating the actuation of said protective means automatically after a time regardless of whether the condition at said point is then restored to the original value or has assumed a different value, and re-setting means for subsequently automatically resetting the device so that the actuating means will respond to a further change in the new condition at said point. Preferably said point in the system is near to the source of disturbance; for example, in a system having fluid consuming means connected by a duct to the compressor outlet, the point is towards the downstream end of the duct near the consuming means. Consequently the auxiliary protective means should be effective before a pressure disturbance initiated at the consuming means reaches the compressor, and should operate until main protective means for delaying surging of the compressor come into action. The latter will usually comprise the combination of pressure measuring and flow measuring means, the first responding to the compressor outlet pressure, the datum for this measurement being set by the second means, and the two being conjointly designed so that the combination has a control line similar to and of a fixed proportion to the surge line of the compressor. These main protective means act to open a blow-off valve on the outlet side of the compressor when the flow at a place remote from that outlet, for example, the consuming means, falls below a critical value. The auxiliary protective means act quickly either to open the same blow-off valve partially or preferably to open an auxiliary blow-off valve. When these means are reset, they initiate only slow re-closing of the valve which they had previously opened.

Should the pressure at the point in the system rise suddenly from one steady value to the new steady value, this control device together with the auxiliary protective means will temporarily open the auxiliary blow-off valve or partially open the main blow-off valve, and after the determined time will initiate the slow closing of the valve in order that the main protective means can follow up and maintain the new steady condition.

The invention still further consists in that the control device has a casing divided into first and second chambers, the actuating means being movable in response to a pressure difference between the chambers, an inlet connection from a fluid duct of the system to the first chamber through a non-return valve, said timing means consisting of a leakage system which connects the two chambers and is proportioned to allow the pressure in the second chamber to become substantially equal to that in the first chamber, only after a given time and said resetting means consisting of a leakage system which connects the chambers to the duct and is proportioned to allow the pressure in both chambers to become substantially equal to the new pressure in the duct only after the pressures in the two chambers have been substantially equal.

The accompanying drawing illustrates a preferred constructional embodiment of the foregoing and other features of the invention as applied to protective means against surging in a fluid system including a dynamic compressor. In the drawing FIGURE 1 shows a schematic arrangement of the system and FIGURE 2 shows a cross-section of a control device forming part of the same system. In the system a dynamic compressor 1 discharges air into a discharge duct 2 which carries the air to consuming means 3 which is assumed to be a combustion apparatus. A change in the operating condition of the latter may give rise to a temporary or lasting increase in the air pressure in the duct immediately upstream of the combustion apparatus which tends to be reflected along the duct in the upstream direction to the compressor where it could cause a reduction of air flow through and surging of the compressor. In accordance with known practice a branch 4 in the duct has a main blow-off valve 5 which is so controlled by the main controller 6 as to tend to maintain the air flow through the compressor without surging in these circumstances. The branch 4 is preferably near the outlet of the compressor so that conditions in the latter are influenced without delay by the action of the blow-off, and the main controller (of the kind hereinbefore mentioned) responds to fluid pressure and flow upstream of the branch. Thus the controlling function of the main controller 6 does not commence until the pressure disturbance is in the vicinity of the compressor and, moreover, is usually slow in operation thereafter. To meet this deficiency there is provided in accordance with the invention a control device 7 which is responsive to pressure in the duct 2 at a point near its downstream end, i.e. immediately upstream of the consuming means 3. The function of the device 7 in brief is to respond rapidly to an increase of duct pressure at said point to close an electrical circuit which in turn opens an auxiliary blow-off valve 8 arranged in parallel with the main blow-off valve 5. The control device 7, shown in FIGURE 2, consists of a casing 9 divided into two separate chambers 10, 11 by a yielding gas-tight partition which may conveniently be a flexible diaphragm 12 clamped between the two halves of a split casing. For mounting on the duct 2 the casing is provided with a screwed stem 13 which is also tubular to serve as an inlet from the duct to the first of the chambers 10. Inside this inlet is a lightly loaded non-return valve 14—preferably with an adjustable loading spring—which will admit fluid from the duct to the first chamber 10 only when the pressure in the duct exceeds that in the chamber and will close when the pressures are equal. An adjustable leak 15 is provided between the first chamber and the second; this may conveniently be formed in a boss 16 on both halves of the casing. A hole 17 extending through this boss lies partly in each half of the casing and two transverse holes 18 put this hole into communication with each chamber to form the leakage path. An adjusting valve 19 screwed into a tapped extension of one hole 18 is in one of the known forms such as a needle valve, a screw with a tapered groove or a screw with its end threads abbreviated so as to be tapered conically or on one side, to allow of a fine adjustment of the cross-section of part 15 of the leakage path. A second leakage path is provided by holes 20 and 21 between the end of the inlet adjacent to the duct and either the second chamber or preferably (as shown) the first chamber, by-passing the non-return valve and having a valve 22 for adjusting the leak 23. If adjustment of the second leak is found to be unnecessary, the non-return valve may be formed so that it does not quite close but forms the second leak. An electric contact tip 24 is mounted on the diaphragm 12 in the second chamber 11; an adjustable complementary contact 25 is formed on or can be moved by an adjusting screw 26 carried by but electrically insulated through the bush 27 from the casing. The contact is connected to an electric circuit 28; the movable contact on the diaphragm is connected to earth through the casing.

In operation, a sudden pressure rise in the duct 2 will open the non-return valve 14, raise the pressure in the first chamber 10 and move the diaphragm 12 to engage the contacts 24, 25 and close the electric circuit 28. Leakage will take place through the first leak 15 into the second chamber 11, until there is no pressure difference between the chambers to keep the diaphragm 12 deflected, whereupon the contacts separate and open circuit. This occurs after a time interval determined by the adjustment of the leak 15 and is substantially independent of whether the pressure has remained high in the duct or the non-return valve has closed. If the pressure in the duct has fallen again, or subsequently if and when this pressure has fallen leakage from the chambers through the second leakage 23 will restore the pressures in the chambers to the same as that in the duct. Thus the device is self re-setting.

Such a device can be designed to respond only to sudden pressure rises and not to gradual rise of pressure; if the rate of increase of pressure be not greater than the rate of pressure leakage through each leak the pressure in the two chambers will increase together and there will at no time be sufficient pressure difference to close the contacts. On the other hand if the device is required, for some purpose, to operate on an increase of pressure without regard to whether it occurs quickly or gradually, the construction is modified as explained hereinafter.

Referring again to FIGURE 1, the circuit 28 closed by the control device 7 energises, through a relay 29 and second circuit 30, a solenoid 31 which moves a piston valve 32 upwards against a compression spring 33. The piston valve 32 controls the supply of compressed air from a conduit 34 to a pneumatic cylinder 35 and piston 36, which latter is connected by a piston rod 37 to the auxiliary blow-off valve 8. The lower face of the piston 36 is in communication through a pipe 38 with the valve chest 39 of the piston valve 32 while the upper face of the piston (from which the piston rod extends) is in communication through a pipe 40 with a reservoir 41 which is in turn connected by a pipe 42 to the valve chest 39. Each of the pipes 38 and 42 has a branch connection 43, 44 through a restricted orifice 45, 46 to the valve chest. The latter has a further connection 47 exhausting to the atmosphere. With the valve 32 in the lower position, under the action of the spring 33, each side of the piston 36 is under the pressure of the air supply from the conduit 34 via the branch connections 43, 44 and restricted orifices 45, 46. In this condition, since the piston rod reduces the effective area of the upper face of the piston, the latter is biased to the upper end of the cylinder in which position it closes the blow-off valve 8.

When the solenoid 31 is energised the valve 32 moves upwards and opens the pipe 38 and the lower face of the piston to atmosphere while sealing the branch pipe 43 from the air conduit 34. Simultaneously, while the restricted air connection to the upper face of the piston through the branch pipe 44 continues, an unrestricted air connection is also made through the main pipe 42. Additionally the reservoir 41 contains a quantity of compressed air. The cumulative effect is that the piston 36 moves very rapidly downwards to open the auxiliary blow-off valve 8.

When after a time the solenoid is de-energised and the valve 32 returns to its original position the air supply to the lower face of the piston 36 is restored only through the restriction 45 while the upper side of the piston is still similarly connected to the air supply. Also the bias on the piston 36 is only that due to the equivalent area of the piston rod on the lower face. Consequently the piston moves rather slowly upwards to progressively close the auxiliary blow-off valve.

The time interval between the closing and opening of the contacts in the control device 7 together with the delayed closing of the auxiliary blow-off valve 8 will enable the main controller 6 to function to open the main blow-off valve 5 which will ultimately re-establish a stable condition of operation in the system.

It will be understood that although the pressure-responsive control device may actuate other control means instead of electric contacts, electric control is very convenient and is preferable, to give practically instantaneous response.

In the described arrangements the contacts could be reversed if opening of their circuit could be used to operate the auxiliary protective means.

While in the above-described embodiment, the quick-acting blow off valve is actuated by a change of pressure in the fluid system, it might alternatively be actuated by a change in some other condition of flow, for example, mass flow or temperature, which change might lead to surging of the compressor.

I claim:

1. A fluid flow system comprising a duct for the flow of fluid; a dynamic compressor connected to the duct to induce said flow therein; protective means associated with the compressor and movable from an inoperative position to an operative position for delaying surging of the compressor; operating means operatively connected to said protective means and operable when energized to move said protective means from said inoperative to said operative position; a control device comprising a casing, control means dividing the casing into first and second chambers and movable in response to a pressure difference between the chambers from an inoperative position to an operative position, means operatively connected between said control means and said operating means for energizing said operating means in response to said control means being in said operative position, means defining an inlet connection between the duct and said first chamber, a non-return valve in said connection for opposing flow from said first chamber, means defining a leakage path connecting said chambers to one another and proportioned to allow the pressure in the first chamber to become equal to that in the second chamber and to allow the control means to move to its inoperative position only after a predetermined interval of time and independently of the then-existing fluid pressure in the duct, and means defining a further leakage path connecting said first chamber and the duct and proportioned to allow the pressure in said chamber to become equal to the pressure in the duct only subsequently to the pressures in the two chambers becoming substantially equal.

2. A fluid flow system comprising a duct for the flow of fluid; a dynamic compressor connected to the duct to induce said flow therein; protective means associated with the compressor and movable from an inoperative position to an operative position for delaying surging of the compressor; operating means operatively connected to said protective means and operable when energized to move said protective means from said inoperative to said operative position; control means operatively connected to said operating means and said duct and operable only in response to an indication of a sudden change in a parameter of fluid in the duct in one direction, which change is one liable to lead to surging of the compressor, to energize said operating means; said control means including timing means to terminate energization of said operating means thereby after a predetermined interval of time, and means operatively connected between said control means and said duct to make said predetermined interval of time independent of a change in said parameter in a direction opposite to said one direction; said operating means being operable to move said protective means from said operative to said inoperative position on termination of the energization of said operating means.

3. A system according to claim 2, wherein said operating means is constructed and arranged to be operable to be operable to move the protective means from said inoperative to said operative position at a greater rate than it is operable to move the protective means from said operative to said inoperative position.

4. A fluid flow system comprising a dynamic compressor having an outlet; fluid consuming means; a duct connecting said fluid consuming means to said outlet of the compressor; protective means associated with the compressor and movable from an inoperative position to an operative position for delaying surging of the compressor; operating means operatively connected to said protective means and operable when energized to move said protective means from said inoperative to said operative position; control means operatively connected to said operating means and said duct and operable only in response to a sudden change in a parameter of fluid in said duct in one direction at a point near said fluid consuming means, which change is one liable to lead to surging of the compressor, to energize said operating means; said control means including timing means to terminate energization of said operating means thereby after a predetermined interval of time, and means operatively connected between said control means and said duct to make said predetermined interval of time independent of a change in said parameter at said point in a direction opposite to said one direction; said operating means being operable to move said protective means from said operative to said inoperative position on termination of the energization of said operating means.

5. A fluid flow system comprising a duct for the flow of fluid; a dynamic compressor connected to the duct to induce said flow therein; protective means associated with the compressor and movable from an inoperative position to an operative position for delaying surging of the compressor; a movable double sided pressure-responsive element operatively connected to said protective means to move said protective means from said inoperative to said operative position; said pressure-responsive element being constructed and arranged to be biased in one direction corresponding to the inoperative position of said protective means; a supply of pressurized fluid; a low pressure exhaust; valve means movable between an operative position in which it establishes a communication between one side of said pressure-responsive element and said supply of pressurized fluid and between the other side of said pressure-responsive element and said low pressure exhaust in a sense opposed to the biasing of said pressure-responsive element and an inoperative position in which it establishes a communication between said two sides of the pressure-responsive element and said supply of pressurized fluid, the communication between said other side of the pressure-responsive element and said source of pressurized fluid being through a restricted orifice; control means movable only in response to a sudden change in a parameter of fluid in the duct, liable to lead to surging of the compressor; first operating means operatively connecting said control means and said valve means and operable by movement of the control means to move said valve means from its inoperative to its operative position; and further operating means operatively connected to said valve means and operable to move said valve means from said operative to said inoperative position on termination of the operation of said first operating means.

References Cited in the file of this patent

UNITED STATES PATENTS

| | | |
|---|---|---|
| 2,000,721 | Standerwick | May 7, 1935 |
| 2,007,777 | Standerwick | July 9, 1935 |
| 2,034,272 | Schroeder | Mar. 17, 1936 |
| 2,398,619 | Clark et al. | Apr. 16, 1946 |
| 2,441,779 | Troeger et al. | May 18, 1948 |
| 2,475,783 | Gibbo | July 12, 1949 |
| 2,508,344 | Fitch | May 16, 1950 |
| 2,618,431 | Walker | Nov. 18, 1952 |
| 2,696,828 | Husing | Dec. 14, 1954 |
| 2,728,518 | Wilde et al. | Dec. 27, 1955 |
| 2,743,051 | Grey | Apr. 24, 1956 |
| 2,804,878 | Fishwood | Sept. 3, 1957 |
| 2,835,266 | Morte | May 20, 1958 |

FOREIGN PATENTS

| | | |
|---|---|---|
| 442,245 | France | June 17, 1912 |
| 700,098 | Great Britain | July 29, 1949 |